United States Patent Office 3,433,403
Patented Mar. 18, 1969

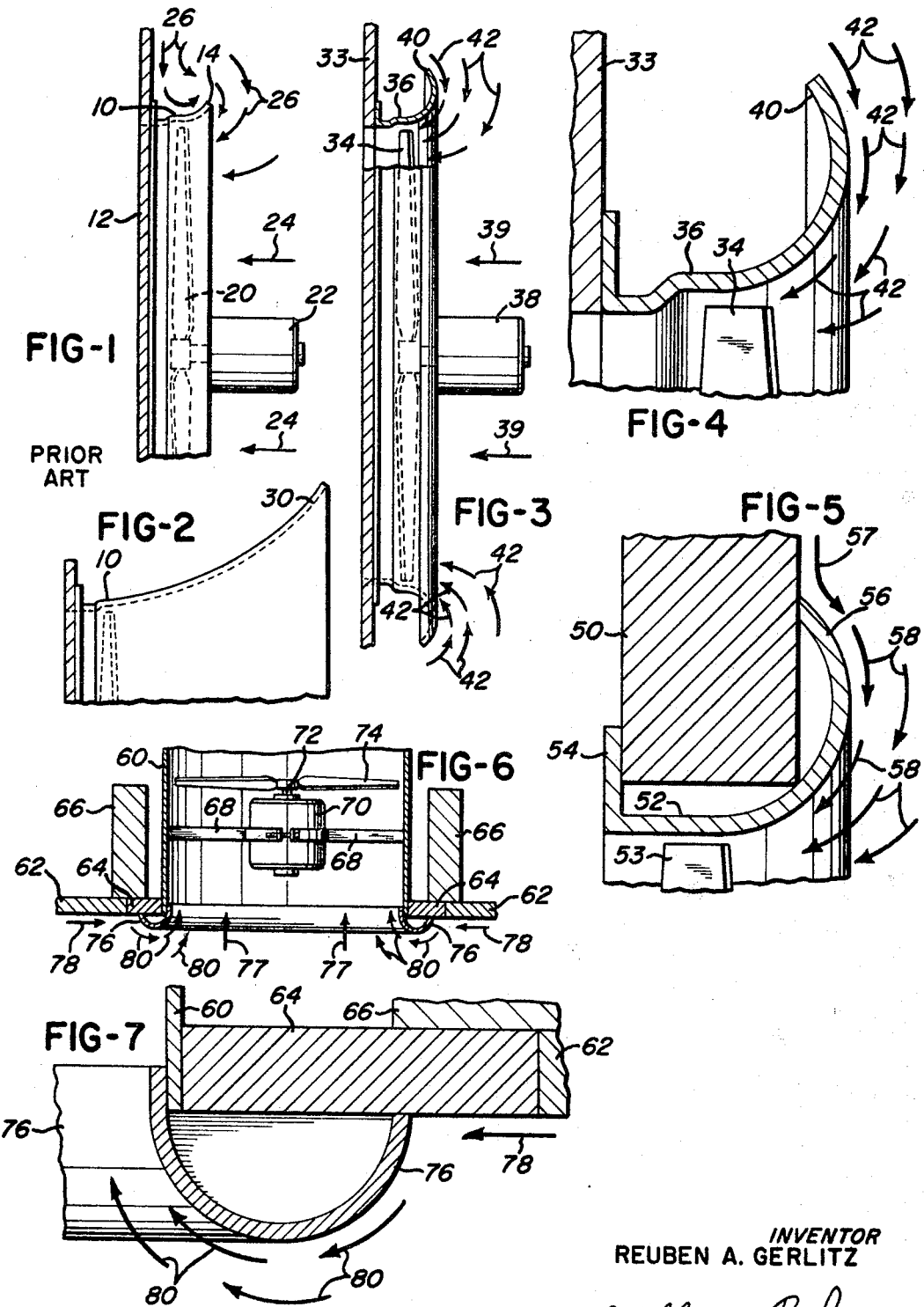

3,433,403
FAN INLET SHROUD
Reuben A. Gerlitz, Springfield, Ohio, assignor, by mesne assignments, to Lau Blower Company, Dayton, Ohio, a corporation of Ohio
Filed Dec. 16, 1966, Ser. No. 602,263
U.S. Cl. 230—132    2 Claims
Int. Cl. F04d 29/66, 19/00

ABSTRACT OF THE DISCLOSURE

This invention relates to an inlet shroud for use with fan structure. The invention relates more particularly to an inlet shroud which reduces turbulence and which increases fan efficiency and thus also reduces noise created by air which is moved by operation of the fan.

Background of the invention

Numerous problems have occurred in regard to fan structure for movement of air or other gas. One of the problems has related to efficiency of operation. Another problem has related to noise of operation of the fan structure. Both of these problems have been associated with air turbulence created in the inlet portion of the fan structure during operation thereof.

Attempts have been made to improve fan structure by reducing turbulence at the inlet portion of the fan structure. However, in the past, attempts to reduce air turbulence at the inlet portion of a fan structure has resulted in devices which are excessively large in physical size.

Thus, an object of this invention is to provide fan structure including shroud structure which creates minimum air turbulence during operation thereof so that the fan and shroud structure has maximum efficiency and minimum noise of operation.

Another object of this invention is to provide such shroud structure which has small physical size in consideration of the dimensions of the fan structure with which the shroud structure is associated.

Summary of the invention

This invention comprises an inlet shroud which smoothly guides flow of air at the inlet portion of the fan structure. With regard to this invention it has been found that the natural flow of fluid into an orifice of a propeller type fan structure at the periphery thereof reverses direction or greatly changes direction as it enters the orifice. The inlet shroud of this invention has reverse curvature with respect to the general direction of fluid flow through the orifice of the propeller fan structure. Thus, the incoming air at the periphery of the fan structure is guided in its natural flow pattern into the orifice of the fan structure. Thus, the incoming air is directed to move in a manner in which there is minimum turbulence. Thus, there is maximum efficiency and minimum noise level in the operation of fan structure to which the inlet shroud is connected.

Brief description of views of the drawing

FIGURE 1 is a fragmentary side elevational view, with parts shown in section, of conventional propeller fan structure, illustrating the manner in which air or other gas flows at the inlet portion of the fan structure.

FIGURE 2 is a fragmentary side elevational view, with parts shown in section and drawn on a larger scale than FIGURE 1, of conventional propeller fan structure and showing a prior art inlet bell which has been devised in an attempt to improve fan operation.

FIGURE 3 is a side sectional view, with parts broken away, of propeller fan structure which includes an inlet shroud of this invention.

FIGURE 4 is an enlarged fragmentary sectional view of a portion of the structure of FIGURE 3.

FIGURE 5 is a fragmentary sectional view, drawn on substantially the same scale as FIGURE 4, showing other fan inlet shroud structure of this invention.

FIGURE 6 is a side sectional view drawn on a reduced scale, of propeller fan structure including other inlet shroud structure of this invention.

FIGURE 7 is an enlarged sectional view of a portion of the structure of FIGURE 6.

Description of the preferred embodiments

Referring to the drawing in detail, conventional propeller fan structure may appear as illustrated in FIGURE 1. An orifice ring 10 is carried by suitable support structure 12 which may be in the form of a wall or the like and which has an opening therein within which the orifice ring 10 is disposed.

The orifice ring 10 has an inlet portion 14 which is curved slightly outwardly and which constitutes the maximum diameter portion of the orifice ring 10. A propeller type of fan 20 is disposed within the orifice ring 10 and is operably connected to a motor 22 for rotation thereby.

Arrows 24 illustrate the manner in which a major portion of air or other fluid is moved into the orifice ring 10 by rotation of the fan 20. In addition to the major portion of air which enters the orifice ring 10, as illustrated by the arrows 24, a strong secondary movement or flow of air occurs in a region adjacent the periphery of the orifice ring 10. This secondary movement of air occurs in various directions leading to the inlet portion 14 of the orifice ring 10. This secondary movement of air is illustrated by arrows 26 in FIGURE 1. It is to be noted that part of the secondary movement or flow of air makes substantially a right angle turn as it enters the orifice ring 10 as illustrated by the arrows 26. Therefore, as parts of the secondary flow of air gather and move into the orifice ring 10 at the periphery thereof, as illustrated by the arrows 26, considerable turbulence occurs. This turbulence results in low efficiency and a high noise level in the operation of the fan structure.

In the past, attempts have been made to improve efficiency of fan operation and to reduce the noise of operation by providing an extension to the orifice ring 10 in the form of a bell, such as a bell 30 shown in FIGURE 2. In order to be effective, the bell 30 extends outwardly a considerable distance from the orifice ring 10. Thus, a bell such as the bell 30 shown in FIGURE 2, causes the overall diameter and dimensions of the fan structure to be excessive, and therefore such a bell as the bell 30 is objectionable.

The invention of this application provides structure which substantially prevents turbulence of fluid flow at the inlet portions of propeller type fan structures while maintaining the physical size and cost of the structure at a minimum.

Operation of a fan within an orifice creates a "suction" effect which moves air or other gas or fluid through the orifice. Of course, suction is nondirectional, and for this reason air tends to flow toward the inlet portion of the orifice with equal velocity from all directions. This effect is discussed above and illustrated by arrows 26 in FIGURE 1. It is to be noted that at the side of the orifice ring 10, a portion of the secondary air stream which is represented by the arrows 26, tends to flow in a direction which is substantially opposite to the direction of the principal air stream which is represented by the arrows 24. Thus, at least part of the secondary air flow as it enters the orifice ring 10, must execute a bend which may be at an angle of nearly 180 degrees. If the secondary air stream does not smoothly change its direction of movement through this very large angle, turbulence occurs and thus inefficiency of operation occurs and a high noise level exists.

The structure of this invention provides means for smoothly guiding toward the orifice all of the air which moves into an orifice ring in a region adjacent the periphery thereof.

FIGURES 3 and 4 show a propeller type of fan 34 which is disposed within an orifice ring 36. The orifice ring 36 is carried by support structure 33. The fan 34 is operably connected to a motor 38 for rotation thereby. Most of the air which flows into the orifice ring 36 as a result of rotation of the fan 34 moves in a direction substantially parallel to the axis of rotation of the fan 34, as illustrated by arrows 39 in FIGURE 3. Joined to the orifice ring 36 is an annular shroud 40 of this invention. The shroud 40 may be integral with the orifice ring 36 as a portion thereof, or the shroud 40 may be a separate element which is joined to the orifice ring 36 in any suitable manner. The shroud 40 may be considered as any toroidal member which is generated by the revolution of a contour which includes a curved guide surface. The curved guide surface of the shroud 40 extends outwardly from the orifice ring 36 in the general direction from which the air flows to the orifice. The curved guide surface has reverse curvature so that the inlet angle or outermost part of the shroud 40 is greater than 90 degrees with respect to the direction of the major movement of air illustrated by arrows 39. The reverse curved surface of the shroud 40 directs all of the air which moves at the periphery of the orifice member 36 to follow the general route along which most of the air naturally flows at the periphery of the orifice member 36. The curved surface may be considered as an annular curved surface. Thus, the annular curved surface of the shroud 40 smoothly guides movement of air into the orifice ring 36 at the peripheral portions thereof, as illustrated by arrows 42 in FIGURES 3 and 4. Thus, operation of the fan structure shown in FIGURES 3 and 4 occurs with maximum efficiency and with a minimum noise level.

FIGURE 5 shows a support member in the form of a wall 50 or the like within which is mounted an orifice ring 52. A fan 53 is rotatably disposed within the orifice ring 52. The orifice ring 52 has a flange 54 which engages a side surface of the wall 50. The orifice ring 52 also has a shroud portion 56 which extends therefrom in reverse curvature.

An arrow 57 illustrates the manner in which air flows along the surface of the wall 50. The shroud portion 56 causes the air which flows along the wall 50 and adjacent thereto to move smoothly toward the opening in the orifice ring 52. Other air adjacent the shroud portion 56 also moves readily toward the opening in the orifice ring 52, as illustrated by arrows 58. Thus, all of the air which enters the orifice ring 52 at the periphery thereof is smoothly guided and directed thereinto by the shroud portion 56.

FIGURES 6 and 7 show a tubular conduit 60 which may be mounted in a ceiling or wall 62. An adapter member 64 joins the tubular conduit 60 to the ceiling or wall 62. Support members 66 are shown in attaching relationship to the ceiling or wall 62 and to the adapter 64.

Within the tubular conduit 60 and attached thereto is a transverse support member 68 which carries a motor 70. The motor 70 has a shaft 72 to which is secured a fan 74 which rotates with operation of the motor 70.

An annular shroud 76 of this invention is attached to the tubular conduit 60 at the inlet end thereof. The shroud 76 is arcuate in cross-section and curves outwardly at the inlet end of the tubular conduit 60. The shroud 76 has an outermost edge which is in engagement with the adapter 64. The edge of the shroud 76 which engages the adapter 64 may be referred to as the inlet edge of the shroud 76. Thus, the inlet edge of the shroud 76 extends at an angle which is substantially 180 degrees from the axis of the tubular conduit 60. Thus, the inlet edge or outermost portion of the shroud 76 is reversed in direction from the direction of the innermost portion or least diameter portion of the shroud 76.

During operation of the fan 74 air is drawn into the tubular conduit 60. A substantial portion of the air flows into the tubular conduit 60 in a line substantially parallel with the central axis of the tubular conduit 60, as illustrated by arrows 77. Suction caused by rotation of the fan 74 also draws air into the tubular conduit 60 at the peripheral portions thereof. Thus, some of the air entering the tubular conduit 60 flows along the ceiling or wall 62, as illustrated by arrows 78; this portion of air then moves over the arcuate surface of the shroud 76 and is guided smoothly into the tubular conduit 60, as illustrated by arrows 80.

Therefore, a shroud of this invention directs air or other gas which flows at the peripheral portions of a fan structure to move smoothly into an orifice of the fan structure. Thus, efficiency of operation of the fan structure is maximum and the noise level of operation thereof is minimum.

It has been found that the optimum inlet angle of a shroud of this invention is within the range of 120 degrees to 180 degrees with respect to the axial direction of air flow into an orifice member with which the shroud is associated. Also, it has been found that, preferably, an annular shroud of this invention has its greatest diameter within the range of 1.15 to 1.4 times the diameter of the orifice of the orifice ring with which the shroud is associated. Also, a shroud of this invention is preferably one in which any transverse section therethrough provides a curve which is an arc of a circle in which the radius of the circle is within the range of from two percent to twelve percent of the diameter of the orifice in the orifice ring with which the shroud is associated. However, curved surfaces which are other than an arc of a circle may also be satisfactory.

Although the preferred embodiment of the invention has been described, it will be understood that within the purview of this invention various changes may be made in the form, details, proportion and arrangement of parts, or the combination thereof to provide a structure within the scope of the appended claims and to accomplish the objects set forth.

I claim:

1. For fan structure having an orifice member provided with an opening therethrough, an annular shroud adapted to be joined to the orifice member coaxial therewith, the annular shroud having an annular guide surface, the annular guide surface being generated by the revolution of an arc of a circle, the annular guide surface having an innermost portion and an outermost portion, the shroud being adapted to guide fluid flow into an orifice member as fluid flows adjacent the outermost portion of the guide surface and then adjacent the innermost portion of the guide surface, the tangent of the outermost portion of the arc which forms the guide surface being at an angle greater than 90 degrees with respect to the tangent of the innermost portion of the arc which forms the guide surface, said tangents being in the direction of fluid flow, the arc being the arc of a circle which has a radius which is in the range of two percent to twelve percent of the diameter of the opening through the orifice member.

2. An inlet shroud for propeller type fan structure comprising, a member having a toroidal surface, the toroidal surface being generated by the revolution of a closed plane curve, a part of the closed plane curve being a fluid flow guide portion, the fluid flow guide portion of the curve to the axis of revolution of the toroid, the fluid flow guide portion of the curve also having an outermost part, the tangent of the outermost part of the curve being greater than 120 degrees and less than 180 degrees with respect to the tangent of the innermost part of the curve so that fluid which flows adjacent the fluid flow guide portion of the curve moves through an angle greater than 120 degrees and less than 180 degrees from the outermost part of the curve to the innermost part thereof, the propeller type fan structure having an orifice therethrough and in which the closed plane curve is an arc of a circle having a radius within the range of two percent to twelve percent of the diameter of the orifice of the fan structure.

References Cited

UNITED STATES PATENTS

| | | | |
|---|---|---|---|
| 2,123,657 | 7/1938 | Munk | 230—120 |
| 2,536,130 | 1/1951 | Herrman | 230—120 |
| 2,609,053 | 9/1952 | Lee | 230—120 |
| 2,620,230 | 12/1952 | Hait | 230—120 |
| 3,145,978 | 8/1964 | Tolson | 230—120 |

FOREIGN PATENTS

| | | |
|---|---|---|
| 1,178,215 | 12/1958 | France. |
| 1,065,560 | 9/1959 | Germany. |
| 511,928 | 8/1939 | Great Britain. |
| 816,536 | 7/1959 | Great Britain. |

HENRY F. RADUAZO, *Primary Examiner.*